United States Patent
Uemura et al.

(10) Patent No.: US 9,609,227 B2
(45) Date of Patent: Mar. 28, 2017

(54) PHOTOGRAPHING APPARATUS, IMAGE PICKUP AND OBSERVATION APPARATUS, IMAGE COMPARISON AND DISPLAY METHOD, IMAGE COMPARISON AND DISPLAY SYSTEM, AND RECORDING MEDIUM

(71) Applicant: OLYMPUS CORPORATION, Hachioji-shi, Tokyo (JP)

(72) Inventors: Tatsuyuki Uemura, Tokyo (JP); Yoshiyuki Fukuya, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/644,580

(22) Filed: Mar. 11, 2015

(65) Prior Publication Data

US 2015/0271415 A1  Sep. 24, 2015

(30) Foreign Application Priority Data

Mar. 24, 2014 (JP) ................ 2014-060535

(51) Int. Cl.
*H04N 5/232* (2006.01)
*H04N 5/247* (2006.01)

(52) U.S. Cl.
CPC ..... *H04N 5/23296* (2013.01); *H04N 5/23203* (2013.01); *H04N 5/23293* (2013.01); *H04N 5/247* (2013.01)

(58) Field of Classification Search
CPC ........... H04N 5/23296; H04N 5/23293; G06K 9/6201
See application file for complete search history.

(56) References Cited

U.S. PATENT DOCUMENTS 7,750,936 B2 * 7/2010 Provinsal ............... H04N 7/181
 345/647
9,215,428 B2 * 12/2015 Babineau ............... H04N 7/181

FOREIGN PATENT DOCUMENTS

JP  2005-236532  9/2005

* cited by examiner

*Primary Examiner* — Joel Fosselman
*Assistant Examiner* — Fayez Bhuiyan
(74) *Attorney, Agent, or Firm* — Volpe and Koenig, P.C.

(57) ABSTRACT

A photographing apparatus includes an image pickup section configured to output a first picked-up image obtained by photographing an object, a display control section for displaying the first picked-up image, a comparing section configured to compare an angle of view of the first picked-up image from the image pickup section and an angle of view of a second picked-up image from a second photographing apparatus, and an angle-of-view determining section configured to control, based on a comparison result of the comparing section, the display control section to display, in the first picked-up image, a display indicating a part or whole of an image pickup range of the second picked-up image.

10 Claims, 14 Drawing Sheets

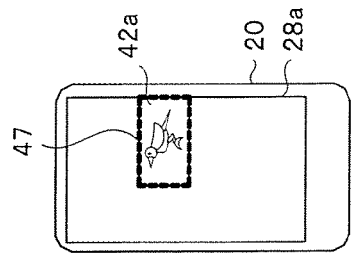
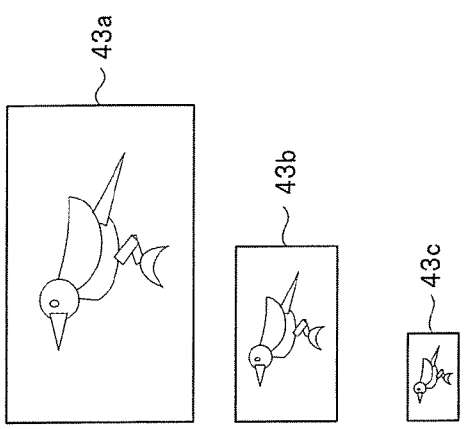
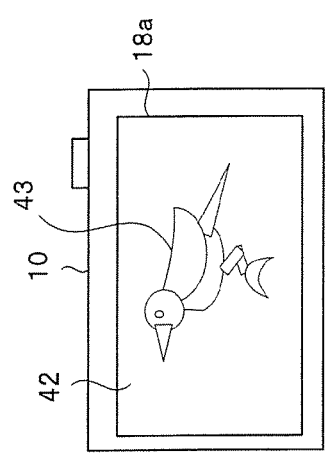
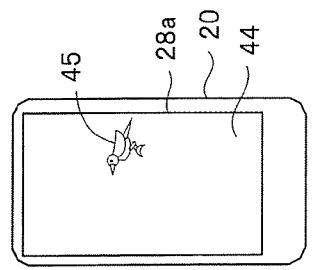

PHOTOGRAPHING APPARATUS, IMAGE PICKUP AND OBSERVATION APPARATUS, IMAGE COMPARISON AND DISPLAY METHOD, IMAGE COMPARISON AND DISPLAY SYSTEM, AND RECORDING MEDIUM

CROSS REFERENCE TO RELATED APPLICATION

This application claim is benefit of Japanese Application No. 2014-60535 in Japan on Mar. 24, 2014, the contents of which are incorporated by this reference.

BACKGROUND OF THE INVENTION

1. Field of the Invention

The present invention relates to a photographing apparatus capable of performing photographing in cooperation with other photographing apparatuses, an image pickup and observation apparatus, an image comparison and display method, an image comparison and display system, and a recording medium.

2. Description of the Related Art

In recent years, a portable apparatus with a photographing function (a photographing apparatus) such as a digital camera includes various photographing functions making full use of image processing. Some photographing apparatus includes a communication function and can transmit images obtained by photographing to other apparatuses and a network.

For example, Japanese Patent Application Laid-Open Publication No. 2005-236532 discloses a digital camera system in which a wireless communication adapter including an antenna for wireless communication is detachably attached to a hot shoe of a camera main body in a digital camera having a function of wirelessly transferring photographed image data and a wireless communication adapter for the digital camera.

Conventionally, a shoe with an adapter for a smart phone for attaching a smart phone to a shoe seat of a camera is also commercialized. The shoe is advantageous in photographing an object with both of the smart phone and the photographing apparatus.

SUMMARY OF THE INVENTION

A photographing apparatus according to the present invention includes: an image pickup section configured to output a first picked-up image obtained by photographing an object; a display control section for displaying the first picked-up image; a comparing section configured to compare an angle of view of the first picked-up image from the image pickup section and an angle of view of a second picked-up image from a second photographing apparatus; and an angle-of-view determining section configured to control, based on a comparison result of the comparing section, the display control section to display, in the first picked-up image, a display indicating a part or whole of an image pickup range of the second picked-up image.

An image pickup and observation apparatus according to the present invention includes: a communication section configured to communicate with a first photographing apparatus including a first image pickup section configured to output a first picked-up image obtained by photographing an object and a display control section for displaying the first picked-up image; a second image pickup section; and a comparing section configured to compare the first picked-up image from the first photographing apparatus and a picked-up image obtained by the second image pickup section. The communication section transmits a comparison result to the first photographing apparatus.

An image comparison and display method according to the present invention includes: a step of acquiring an image signal from a first image pickup section that picks up a first picked-up image; a step of acquiring an image signal from a second image pickup section that picks up a second picked-up image; a step of determining image acquisition ranges respectively of the first and second image pickup sections; a step of comparing the image signals from the first and second image pickup sections; and a display control step of performing, based on the comparison result, control to display, in a wider one of the image acquisition ranges of the first and second image pickup sections, a display indicating a part or whole of a picked-up image in a narrower range.

An image comparison and display system according to the present invention includes: a first image pickup section configured to pick up a first picked-up image; a second image pickup section configured to pick up a second picked-up image; an angle-of-view determining section configured to determine image acquisition ranges respectively of the first and second image pickup sections; a comparing section configured to compare the picked-up images respectively acquired by the first and second image pickup sections; and a display control section configured to perform, based on the comparison result of the comparing section, control to display, in a wider one of the image acquisition ranges of the first and second image pickup sections, a display indicating a part or whole of a picked-up image in a narrower range.

A non-transitory computer-readable recording medium according to the present invention has recorded therein an image comparison display program for causing a computer to execute: a step of acquiring an image signal from a first image pickup section that picks up a first picked-up image; a step of acquiring an image signal from a second image pickup section that picks up a second picked-up image; a step of determining image acquisition ranges respectively of the first and second image pickup sections; a step of comparing the picked-up images respectively acquired by the first and second image pickup sections; and a display control step of performing, based on the comparison result, control to display, in a wider one of the image acquisition ranges of the first and second image pickup sections, a display indicating a part or whole of a picked-up image in a narrower range.

The above and other objects, features and advantages of the invention will become more clearly understood from the following description referring to the accompanying drawings.

BRIEF DESCRIPTION OF THE DRAWINGS

FIGS. 9A to 9D are explanatory diagrams showing an example of image comparison processing in step S36 in FIG. 4;

DETAILED DESCRIPTION OF THE PREFERRED EMBODIMENTS

Embodiments of the present invention are explained in detail below with reference to the drawings.

First Embodiment

Figure 1:
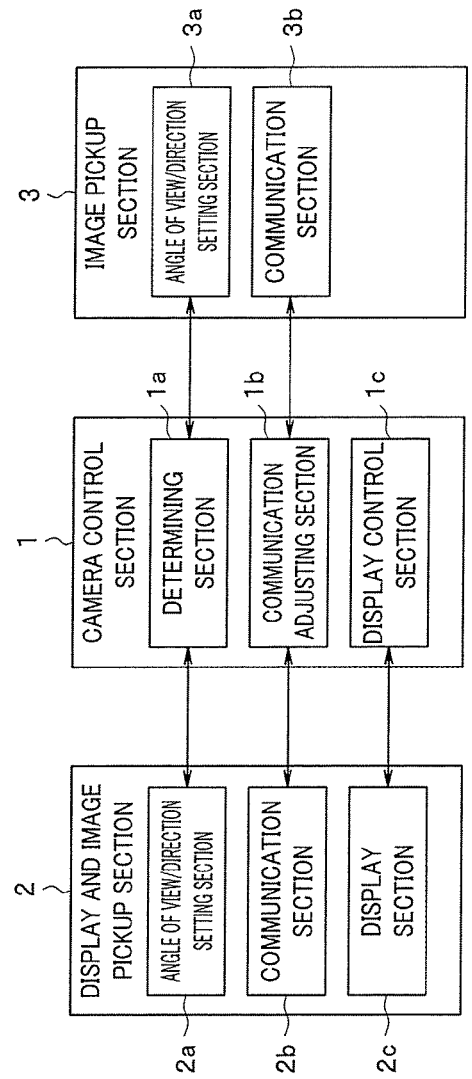
FIG. 1 is a block diagram showing a circuit configuration of a photographing apparatus according to a first embodiment of the present invention.
Figure 2:
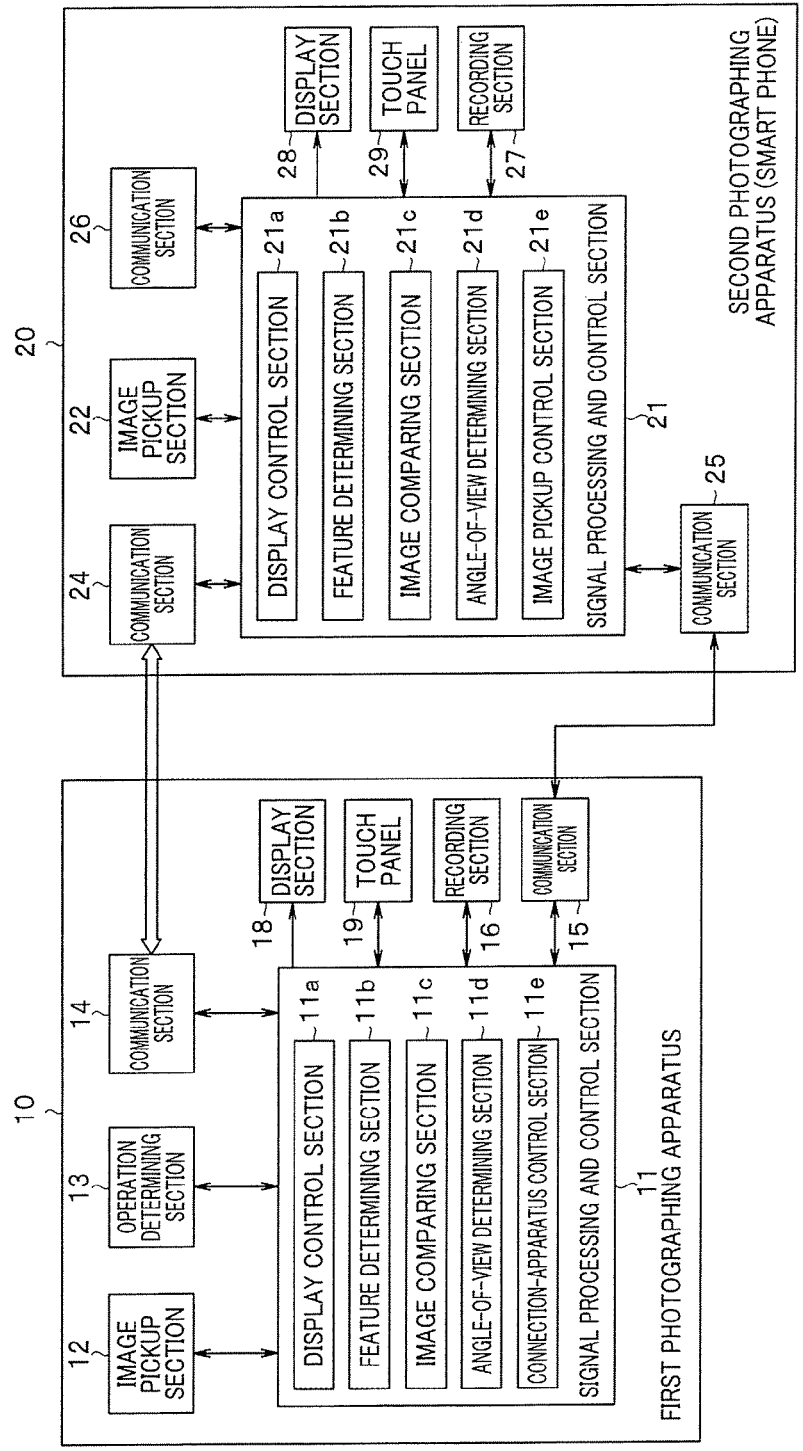
FIG. 2 is a circuit diagram showing an example in which the embodiment is realized by a smart phone including a built-in camera and a camera.
Figure 3:
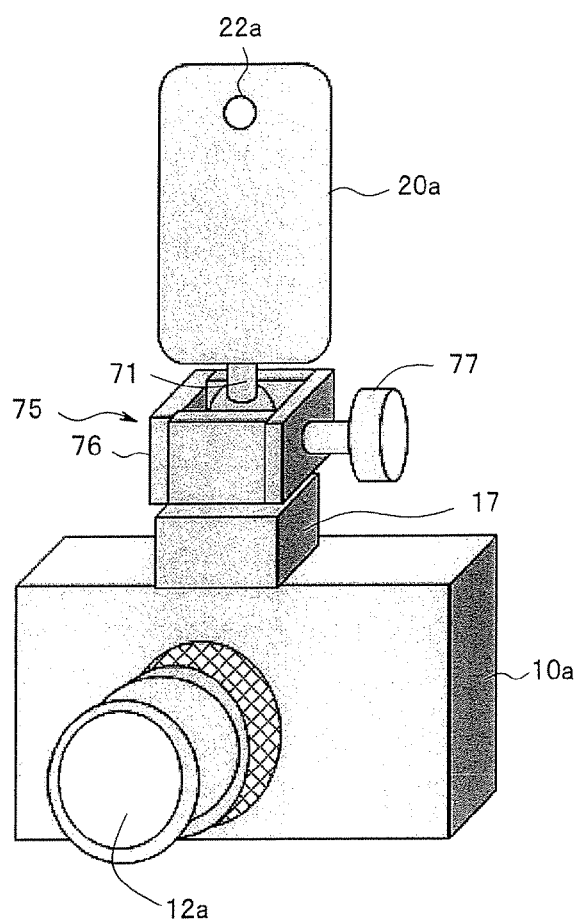
FIG. 3 is an explanatory diagram showing an external appearance in FIG. 2.

FIG. 1 is a block diagram showing a photographing apparatus according to a first embodiment of the present invention. FIG. 2 is a circuit diagram showing an example in which the present embodiment is realized by a smart phone including a built-in camera and a camera. FIG. 3 is an explanatory diagram showing an external appearance in FIG. 2.

There are provided a method and a system (or a program for realizing the system) for acquiring an image signal from a first image pickup section, acquiring an image signal from a second image pickup section, determining image acquisition ranges of the respective two image pickup sections, and observing and displaying a target object without missing the target object while viewing a wider image pickup range. The two image signals may be compared. However, in the embodiment, the comparison is omitted by determining the image signals in advance. One image pickup section always has a wide angle of view.

Display control is performed to display, in a wider one of the image acquisition ranges of the two image pickup sections, a display indicating a part or all of a picked-up image in a narrower range. If an image pickup result of another narrower angle of view is auxiliarily displayed in the image acquisition range having a wider angle of view, a user can select, according to a situation, at which angle of view the user views the picked-up images.

Naturally, an apparatus that cannot decide such treatment of the angles of view may perform, based on a comparison result of the angles of view (the image acquisition ranges), control to display, in the wider one of the image acquisition ranges of the two image pickup sections, a part or all of the picked-up image in the narrower range.

In general, a smart phone is always used in a started state even if a display screen is off. Therefore, the smart phone can turn on the display screen in a relatively short time. Therefore, in the present embodiment, when the smart phone and the camera are used in cooperation with each other, it is possible to perform high-speed photographing without missing a shutter releasing opportunity by effectively using image pickup and display by the built-in camera of the smart phone. Even when the same object is photographed by the built-in camera of the smart phone and the camera, it is possible to perform photographing at angles of view different from each other. Therefore, in the present embodiment, the user can easily capture the object during photographing by using display of a picked-up image of the camera that does not perform photographing.

That is, an example is explained in which the smart phone and the camera share roles such that the smart phone performs observation (and recording) at a wide angle of view and the camera performs observation (and recording) at a narrow angle of view. This makes it possible to perform check and photographing at a narrow angle of view while preventing missing of a target object.

In FIG. 1, a display and image pickup section 2 and an image pickup section 3 include not-shown image pickup elements and can pick up images of the same object. The display and image pickup section 2 and the image pickup section 3 respectively include communication sections 2b and 3b. The display and image pickup section 2 and the image pickup section 3 include angle-of-view/direction setting sections 2a and 3a. The angle-of-view/direction setting sections 2a and 3a respectively can set angles of view and photographing directions of the display and image pickup section 2 and the image pickup section 3 and transmit information concerning the angles of view and the photographing directions via the communication sections 2b and 3b. The display and image pickup section 2 includes a display section 2c that performs display of a picked-up image, menu display, and the like.

In the present embodiment, a camera control section 1 includes a communication adjusting section 1b that controls the communication sections 2b and 3b of the display and image pickup section 2 and the image pickup section 3. The communication adjusting section 1b controls the communication sections 2b and 3b and enables data transmission between the display and image pickup section 2 and the image pickup section 3. For example, the communication adjusting section 1b can also transmit, with the communication sections 2b and 3b, a picked-up image from the image pickup section 3 to the display and image pickup section 2.

Information concerning angles of view and photographing directions is given to the camera control section 1 from the angle-of-view/direction setting sections 2a and 3a of the display and image pickup section 2 and the image pickup section 3. A determining section 1a of the camera control section 1 determines, based on the transmitted information concerning the angles of view and the photographing directions, photographing ranges (visual field ranges) of the display and image pickup section 2 and the image pickup section 3 and outputs a determination result to a display control section 1c. Note that the information concerning the angles of view and the photographing directions can also be transferred to the camera control section 1 by the display and image pickup section 2 and the image pickup section 3 at time before image pickup is enabled immediately after start.

The camera control section 1 includes a display control section 1c that controls display of the display section 2c of the display and image pickup section 2. The determination result of the determining section 1a is given to the display control section 1c. The display control section 1c can cause the display section 2c of the display and image pickup section 2 to display the photographing range of the image pickup section 3 as auxiliary display. The display section 2c of the display and image pickup section 2 can display a picked-up image of the display and image pickup section 2 and display auxiliary display over the picked-up image.

The user can check or estimate a photographing range of a picked-up image by the image pickup section 3 by checking the auxiliary display displayed on the display section 2c of the display and image pickup section 2. For example, when a start time of the display section 2c of the display and image pickup section 2 is sufficiently short and the display and image pickup section 2 performs sufficiently wide-angle image pickup, the user can estimate a picked-up image by the image pickup section 3 from the display of the display section 2c in a short time from the start of the display and image pickup section 2 and can perform assured photographing without missing a shutter releasing opportunity.

In FIG. 2, each of a first photographing apparatus 10 and a second photographing apparatus 20 is equivalent to the image pickup section 3 or the display and image pickup section 2 shown in FIG. 1. The camera control section 1 shown in FIG. 1 is provided in both of the first and second photographing apparatuses 10 and 20 in the example shown in FIG. 2. The camera control section 1 may be provided in any one of the first and second photographing apparatuses 10 and 20.

The photographing apparatus 10 equivalent to the image pickup section 3 and the camera control section 1 shown in FIG. 1 includes an image pickup section 12 configured by an image pickup device such as a CCD or CMOS sensor. The image pickup section 12 captures an object image via a not-shown lens provided on the front surface of the photographing apparatus 10 and photoelectrically converts the object image to obtain a picked-up image. The image pickup section 12 is controlled to be driven by a signal processing and control section 11 and photographs an object and outputs a picked-up image.

The signal processing and control section 11 outputs a driving signal for the image pickup section 12 to the image pickup section 12 and reads out the picked-up image from the image pickup section 12. The signal processing and control section 11 applies predetermined signal processing such as color adjustment processing, matrix transformation processing, noise removal processing, and other kinds of signal processing to the read-out picked-up image.

In the photographing apparatus 10, an operation determining section 13 is also disposed. The operation determining section 13 generates an operation signal based on user operation on a not-shown operation section including a release button, function buttons, and various switches for photographing mode setting and the like provided in the photographing apparatus 10 and outputs the operation signal to the signal processing and control section 11. The signal processing and control section 11 controls the respective sections based on the operation signal.

A display control section 11a of the signal processing and control section 11 executes various kinds of processing concerning display. The display control section 11a can give a picked-up image after the signal processing to a display section 18. The display section 18 includes display screens such as an LCD and displays the image given from the display control section 11a. The display control section 11a can also cause the display screens to display various menu displays and the like.

A touch panel 19 is provided in the photographing apparatus 10. For example, by providing the touch panel 19 on the display screen 18a (see FIG. 5) of the display section 18, it is possible to generate an operation signal corresponding to a position on a display screen pointed by a finger of the user. Consequently, the user can easily perform selection operation or the like for an image displayed on the display screen 18a of the display section 18.

Figure 5:
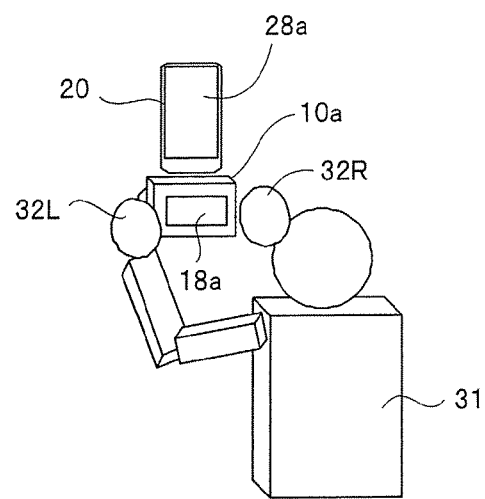
FIG. 5 is an explanatory diagram showing the external appearances and states of photographing of a photographing apparatus 10 and a photographing apparatus 20.

Note that the display screen 18a of the display section 18 is disposed to occupy, for example, substantially the entire region of the back of the photographing apparatus 10 (see FIG. 5). A photographer can check a through-image displayed on the display screen 18a of the display section 18 during photographing and can perform photographing operation while checking the through-image.

The signal processing and control section 11 can compress a picked-up image after the signal processing, give an image after the compression to a recording section 16, and cause the recording section 16 to record the image. As the recording section 16, for example, a card interface can be adopted. The recording section 16 can record image information, sound information, and the like in a recording medium such as a memory card and read out and reproduce the image and sound information recorded in the recording medium.

As shown in FIG. 3, an accessory shoe 17 is provided in a housing 10a of the photographing apparatus 10. The photographing apparatus 20 such as a smart phone can be attached to the accessory shoe 17. FIG. 3 shows a mechanism for enabling adjustment work for optical axis alignment. Note that the mechanism and the adjustment work for aligning optical axes shown in FIG. 3 are not essential configurations for the present embodiment. The adjustment work for the optical axis alignment of the photographing apparatus 10 and the photographing apparatus 20 does not always have to be performed.

In FIG. 3, the housing 10a of the photographing apparatus 10 and a housing 20a of the photographing apparatus 20 are connected by a screw and a ball joint 75. The accessory shoe 17 is disposed on the upper surface of the housing 10a. The screw and the ball joint 75 are disposed on the upper surface of the accessory shoe 17. The screw and the ball joint 75 are configured by an attachment main body 76 having a spherical surface receiving section and a ball stud 71, a spherical section of which is slidably supported by the spherical surface receiving section. The housing 20a of the photographing apparatus 20 is attached to and fixed to the upper end of the ball stud 71.

The spherical surface receiving section of the attachment main body 76 and the ball stud 71 are fixed to each other by tightening a screw 77. By loosening the screw 77, the spherical section of the ball stud 71 becomes slidable with respect to the spherical surface receiving section. The photographing apparatus 20 can be rotated in an elevation/depression angle direction and an azimuth direction around the spherical section. By tightening the screw 77 after aligning the optical axis of the photographing apparatus 20 with the optical axis of the photographing apparatus 10, the photographing apparatuses 10 and 20 can be fixed in a state in which the optical axes are aligned.

In the present embodiment, the photographing apparatus 10 and the photographing apparatus 20 can perform photographing in cooperation with each other. A communication section 14 can communicate with a communication section 24 provided in the photographing apparatus 20. Transmission and reception of data between the signal processing and control section 11 and the photographing apparatus 20 can be performed. The signal processing and control section 11 includes a function of the communication adjusting section 1b shown in FIG. 1 and can operate in a cooperative photographing mode for performing photographing in cooperation between the photographing apparatuses 10 and 20.

The photographing apparatus 20 can be configured by, for example, a smart phone. The photographing apparatus 20 includes a signal processing and control section 21. The signal processing and control section 21 controls the respective sections of the photographing apparatus 20. The photographing apparatus 20 includes not only the communication section 24 but also communication sections 25 and 26. The communication section 26 can transmit various data via a predetermined network such as a telephone line and capture various data from the predetermined network. The signal processing and control section 21 includes a function of the communication adjusting section 1b shown in FIG. 1 and controls the communication sections 24 to 26.

The communication section 25 performs communication with a communication section 15 provided in the photographing apparatus 10. Transmission and reception of data can be performed between the signal processing and control sections 11 and 21 by the communication sections 15 and 25. For example, the communication sections 15 and 25 are communicable in a short time after start compared with the communication sections 14 and 24. Transmission of information is possible even at time before the image pickup section 12 becomes capable of performing image pickup immediately after a power supply is turned on. For example, it is conceivable that the communication sections 14 and 24 are adapted to a wireless LAN such as Wifi (wireless fidelity) and the communication sections 15 and 25 are adapted to Bluetooth (registered trademark) and infrared communication.

The photographing apparatus 20 includes an image pickup section 22 configured by an image pickup device such as a CCD or CMOS sensor. The image pickup section 22 captures an object image via a not-shown lens provided on the front surface of the photographing apparatus 20, photoelectrically converts the object image, and obtains a picked-up image. The image pickup section 22 is controlled to be driven by the signal processing and control section 21 and photographs an object and outputs a picked-up image. An image pickup control section 21e of the signal processing and control section 21 outputs a driving signal for the image pickup section 22 to the image pickup section 22. Zoom control and focus control can be performed by the image pickup control section 21e. The signal processing and control section 21 reads out a picked-up image from the image pickup section 22 and applies predetermined signal processing such as color adjustment processing, matrix transformation processing, noise removal processing, and other various kinds of signal processing to the read-out picked-up image.

A display control section 21a of the signal processing and control section 21 executes various kinds of processing concerning display. The display control section 21a can give a picked-up image after the signal processing to a display section 28. The display section 28 includes a display screen 28a (see FIG. 5) such as an LCD and displays the image given from the display control section 21a. The display control section 21a can also display various kinds of menu display and the like on the display screen 28a.

A touch panel 29 is provided in the photographing apparatus 20. For example, by providing the touch panel 29 on the display screen 28a of the display section 28, it is possible to generate an operation signal corresponding to a position on the display screen 28a pointed by a finger of a user. Consequently, the user can easily perform selection operation and the like for an image displayed on the display screen 28a of the display section 28.

Note that the display screen 28a of the display section 28 is disposed to occupy, for example, substantially the entire region of the photographing apparatus 20 (see FIG. 5). A photographer can check a through-image displayed on the display screen 28a of the display section 28 during photographing and can perform photographing operation while checking the through-image.

The signal processing and control section 21 can compress a picked-up image after the signal processing, give an image after the compression to a recording section 27, and cause the recording section 27 to record the image. The recording section 27 can record image information, sound information, and the like in a recording medium and read out and reproduce the image and sound information recorded in the recording medium.

In the present embodiment, a connection-apparatus control section 11e of the signal processing and control section 11 can detect that the photographing apparatus 20 is connected to the accessory shoe 17. For example, when the connection of the photographing apparatus 20 to the accessory shoe 17 is detected by the connection-apparatus control section 11e, the signal processing and control section 11 shifts to the cooperative photographing mode. In the cooperative photographing mode, the connection-apparatus control section 11e can perform image pickup control, transmission control for images and information, display control, and the like concerning the photographing apparatus 20.

In the cooperative photographing mode, a feature determining section 11b of the signal processing and control section 11 determines features of a picked-up image (hereinafter also referred to as first picked-up image) from the image pickup section 12. For example, the feature determining section 11b sets, as a feature detection region, a region of a predetermined size in the center of the first picked-up image and calculates features concerning an image in the feature detection region. The feature determining section 11b may set, as the feature detection region, an image portion of a range designated by the user in the first picked-up image and calculate features of the region. Note that the feature detection region may be the entire image.

Information concerning image features of a picked-up image (hereinafter also referred to as second picked-up image) of the photographing apparatus 20 is given to an image comparing section 11c via the communication sections 24 and 14. The image comparing section 11c determines whether an image portion having a feature substantially coinciding with a feature of an image in the feature detection region of the first picked-up image is present in the second picked-up image. When the image portion is present, the image comparing section 11c calculates a position on the second picked-up image concerning the image portion having the coinciding feature. Note that a picked-up image may be given to the feature determining section 11b from the photographing apparatus 20 via the communication sections 24 and 14. The feature determining section 11b may determine image features of the second picked-up image and supply a determination result to the image comparing section 11c.

The detection result of the image comparing section 11c is given to an angle-of-view determining section 11d. The angle-of-view determining section 11d can generate a frame image indicating a range on the second picked-up image corresponding to the feature detection region of the first picked-up image.

In the present embodiment, in the cooperative photographing mode, the signal processing and control section 11 can transmit the information concerning the frame image to the photographing apparatus 20 via the communication sections 14 and 24. The display control section 21a of the signal processing and control section 21 of the photographing apparatus 20 displays a picked-up image from the image pickup section 22 on a display screen 28a of the display section 28 and displays the frame image over the picked-up image. That is, the user can check a photographing range of the feature detection region of the photographing apparatus 10 referring to display of the display section 28 of the photographing apparatus 20.

For example, when an angle of view of the image pickup section 22 of the photographing apparatus 20 is sufficiently wide, even when an angle of view of the image pickup section 12 of the photographing apparatus 10 is narrow, it is possible to check an object on the display screen 28a. The user can surely grasp and photograph the object in the photographing apparatus 10 while viewing the display screen 28a.

Note that, in the above explanation, a picked-up image is received and features of the image are calculated from the received picked-up image or image features separately calculated from the picked-up image are received and a frame image is generated according to determination of coincidence of the image features. However, the frame image may be directly generated from information concerning an angle of view and a photographing direction.

For example, if the communication sections 15 and 25 become communicable in a short time immediately after start, it is possible to transmit information concerning an image angle of view and a photographing direction via the communication sections 15 and 25. The angle-of-view determining section 11d can generate, based on the received information concerning the angle of view and the photographing direction, a frame image indicating a range on the second picked-up image corresponding to, for example, an image portion in the center or the entire image of the first picked-up image. The signal processing and control section 11 can transmit the frame image to the photographing apparatus 20 and can display the frame image over the second picked-up image on the display screen 28a of the display section 28.

Consequently, it is also possible to check a photographing range beforehand on the display screen 28a before photographing becomes possible in the image pickup section 12 of the photographing apparatus 10, for example, immediately after start. In this case, the user can photograph an object immediately after the image pickup section 12 becomes capable of performing photographing. The user has room for performing photographing without missing a shutter releasing opportunity.

Note that the signal processing and control section 11 can also transmit the first picked-up image to the photographing apparatus 20 via the communication sections 14 and 24 and cause the photographing apparatus 20 to transmit the first picked-up image to a predetermined network. The signal processing and control section 11 can also operate the photographing apparatus 20 by generating an operation signal for the photographing apparatus 20 based on user operation and transmitting the operation signal to the photographing apparatus 20 via the communication sections 14 and 24. Consequently, it is also possible to perform photographing in the image pickup section 22 of the photographing apparatus 20 according to the operation of the photographing apparatus 10.

In this way, the photographing apparatus 10 can realize the function of the camera control section 1 shown in FIG. 1. The photographing apparatus 20 includes a feature determining section 21b, an image comparing section 21c, and an angle-of-view determining section 21d having configurations same as the configurations of the feature determining section 11b, the image comparing section 11c, and the angle-of-view determining section 11d. Therefore, the photographing apparatus 20 can also realize the function of the camera control section 1 shown in FIG. 1, that is, the function of generating a frame image.

Figure 4:
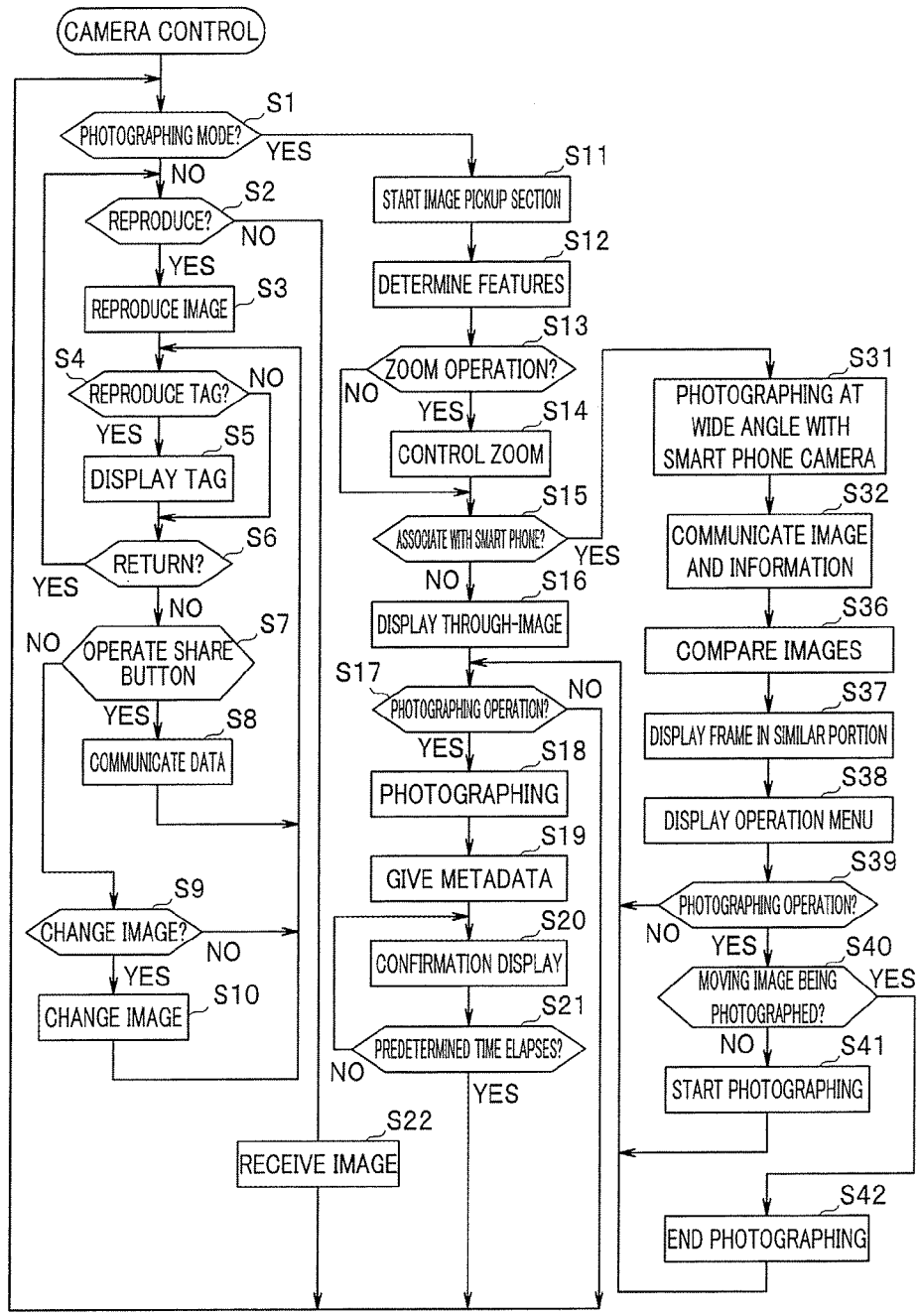
FIG. 4 is a flowchart for explaining camera control in a first embodiment.
Figure 6A:
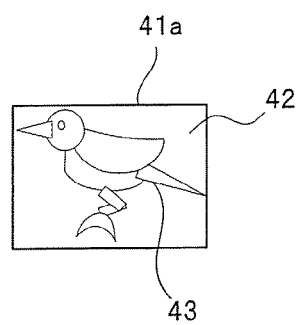
FIGS. 6A and 6B are explanatory diagrams for explaining display on a display screen 18a of a display section 18 and display on a display screen 28a of a display section 28.
Figure 6B:
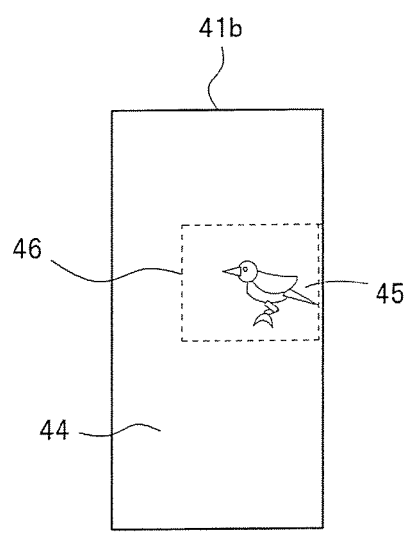
Figure 7A:
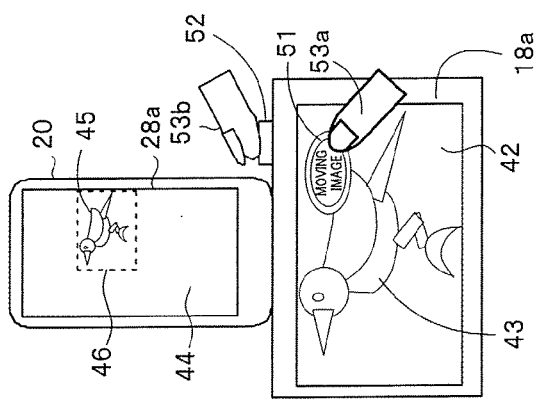
FIGS. 7A and 7B are explanatory diagrams for explaining operations in the first embodiment.
Figure 7B:
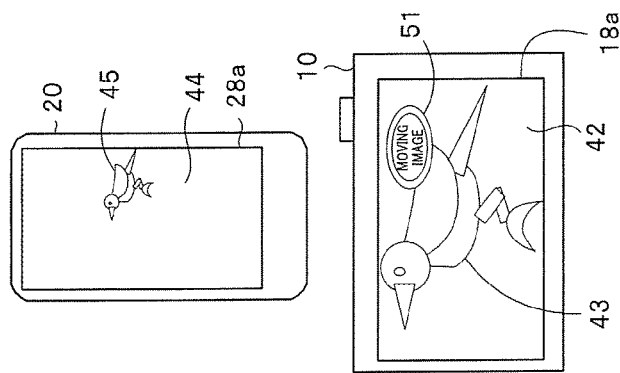

Operations in the embodiment configured as explained above are explained with reference to FIGS. 4 to 10. FIG. 4 is a flowchart for explaining camera control in the first embodiment. FIG. 5 is an explanatory diagram showing the external views and states of photographing of the photographing apparatus 10 and the photographing apparatus 20. FIGS. 6A and 6B are explanatory diagrams for explaining display on the display screen 18a of the display section 18 and display on the display screen 28a of the display section 28. FIGS. 7A and 7B are explanatory diagrams for explaining an operation in the embodiment.

A photographer attaches the photographing apparatus 20 such as a smart phone to the accessory shoe 17 of the photographing apparatus 10. FIG. 5 shows this state. A photographer 31 can perform photographing, for example, in a state in which the photographer 31 grips the housing 10a of the photographing apparatus 10 with a right hand 32R and a left hand 32L and grasps an object in a visual field range while viewing a through-image displayed on the display screen 18a of the display section 18. The photographer 31 can display a picked-up image on the display screen 28a by operating the touch panel 29 provided on the display screen 28a of the photographing apparatus 20 with a finger. Further, photographer 31 can photograph the displayed object by performing touch operation or the like.

When the photographing apparatus 10 and the photographing apparatus 20 do not cooperate, picked-up images obtained by the respective image pickup sections 12 and 22 are displayed on the display screens 18a and 28a of the respective photographing apparatuses 10 and 20.

On the other hand, in the present embodiment, the photographing apparatus 10 and the photographing apparatus 20 can perform photographing in cooperation with each other. When the photographing apparatus 20 is attached to the photographing apparatus 10, a picked-up image picked up by the photographing apparatus 20 is displayed on the display screen 28a of the photographing apparatus 20. Angle-of-view display 46, which is a frame image corresponding to the feature detection region of the photographing apparatus 10, is displayed on the picked-up image.

FIGS. 6A and 6B show this state. FIG. 6A shows a through-image 41a displayed on the display screen 18a of the display section 18. FIG. 6B shows a display image 41b displayed on the display screen 28a of the display section 28. The through-image 41a shown in FIG. 6A is equivalent to the first picked-up image by the image pickup section 12 of the photographing apparatus 10. The display image 41b shown in FIG. 6B includes the second picked-up image by the image pickup section 22 of the photographing apparatus 20.

For example, if the photographing apparatuses 10 and 20 photograph substantially the same direction, the photographing apparatus 20 performs photographing at a wide angle, and the photographing apparatus 10 performs telescopic photographing, an image of a part of a region of a photographing range picked up in the photographing apparatus 20 is picked up by the photographing apparatus 10. In this case, the through-image 41a is a telescopic image 42 by the image pickup section 12. The image 41b includes a wide-angle image 44 by the image pickup section 22. The telescopic image 42 is a part of the wide-angle image 44.

In the example shown in FIGS. 6A and 6B, an image 43 of a bird is displayed in substantially the entire region in the telescopic image 42. On the other hand, an image 45 of the bird is displayed in a part of the wide-angle image 44. In the present embodiment, a frame image corresponding to a feature detection region, which is a part or all of the telescopic image 42, is displayed over the wide-angle image 44 as the angle-of-view display 46.

That is, in the present embodiment, the angle-of-view display 46 indicating, by the frame image, where the telescopic image 42 is positioned in the wide-angle image 44 is displayed in the wide-angle image 44.

The angle-of-view display 46 indicating the feature detection region of the photographing apparatus 10 is displayed on the display screen 28a of the photographing apparatus 20. Therefore, the photographer can grasp a photographing range by the photographing apparatus 10 only with the display of the display screen 28a. For example, even when an object about to be photographed by the photographing apparatus 10 moves and cannot be tracked, since the angle-of-view display 46 indicating the range of the telescopic image 42 being picked up by the photographing apparatus 10 is displayed in the wide-angle image 44, it is possible to easily find the target object and track the object again by checking only the wide-angle image 44 on the display screen 28a.

Such camera control is explained with reference to FIG. 4.

In step S1 in FIG. 4, the signal processing and control section 11 determines whether the signal processing and control section 11 is in a photographing mode. When the photographing mode is not instructed, in step S2, the signal processing and control section 11 determines whether a reproduction mode is instructed. When the reproduction mode is instructed, in step S3, the signal processing and control section 11 performs reproduction of an image. When the user instructs reproduction of a tag, which is related information accompanying the reproduced image, the signal processing and control section 11 shifts the processing from step S4 to step S5 and performs display (tag display) of the information related to the reproduced image.

In step S6, the signal processing and control section 11 determines whether the user performs operation for returning the processing to step S2. When this operation is not performed, in step S7, the signal processing and control section 11 determines whether a share button for laying open a picked-up image to the public is operated. A not-shown share button is disposed in the photographing apparatus 10. When the user attempts to transfer a picked-up image to a server or the like on a network line such as the Internet, the user operates the share button.

In the present embodiment, when the share button is operated, the signal processing and control section 11 of the photographing apparatus 10 transmits the picked-up image to the photographing apparatus 20 via the communication section 14 together with a command for controlling communication of the photographing apparatus 20. The signal processing and control section 21 of the photographing apparatus 20 controls the communication section 25 according to a command from the photographing apparatus 10 and transmits the picked-up image transferred from the photographing apparatus 20 to the not-shown network line (step S8). In this way, even when the photographing apparatus 10 does not include a communication section connected to the network line, it is possible to perform image transmission using the communication section of the photographing apparatus 20.

When the user instructs changed reproduction of the reproduced image, the signal processing and control section 11 shifts the processing from step S9 to step S10 and changes the image to be reproduced. When the reproduction mode is not designated in step S2, in step S22, the signal processing and control section 11 performs image reception via the photographing apparatus 20. Thereafter, the signal processing and control section 11 returns the processing to step S1.

It is assumed that the photographing mode is instructed by the user. In step S11, the signal processing and control section 11 starts the image pickup section 12 and captures a picked-up image. In step S12, the feature determining section 11b of the signal processing and control section 11 performs feature determination. The feature determining section 11b determines features of the picked-up image obtained by the image pickup section 12. The features are used for image comparison to be explained below.

In step S13, the signal processing and control section 11 determines presence or absence of zoom operation. When the zoom operation is performed, zoom control is performed (step S14). Subsequently, in step S15, the signal processing and control section 11 determines whether the cooperative photographing mode with another photographing apparatus is set (smart phone cooperation). For example, when the photographing apparatus 20 such as a smart phone is attached to the accessory shoe 17 of the photographing apparatus 10, the connection-apparatus control section 11e detects the attachment and sets the cooperative photographing mode.

If the cooperative photographing mode is not set, the photographing apparatus 10 and the photographing apparatus 20 operate independently from each other. For example, FIG. 7A shows a state in which the photographing apparatus 10 and the photographing apparatus 20 photograph substantially the same direction. In the photographing apparatus 10, a photographed image is displayed as a through-image (step S16). FIG. 7A shows a state in which the telescopic image 42 including the image 43 is displayed on the display screen 18a of the photographing apparatus 10 and a state in which the wide-angle image 44 including the image 45 is displayed on the display screen 28a of the photographing apparatus 20. Note that the image 43 in the telescopic image 42 and the image 45 in the wide-angle image 44 are images of the same object. An operation button 51 for moving image photographing is displayed on the display screen 18a.

When the photographing operation is performed, in step S17, the signal processing and control section 11 detects the photographing operation. In step S18, the signal processing and control section 11 performs photographing. The picked-up image from the image pickup section 12 is subjected to predetermined signal processing by the signal processing and control section 11. In step S19, the signal processing and control section 11 gives metadata and records the metadata in the recording section 16 together with the picked-up image. In step S20, rec view display (confirmation display) is performed until a predetermine time elapses (step S21).

On the other hand, when the photographing apparatus 20 is attached to the accessory shoe 17 of the photographing apparatus 10, the cooperative photographing mode is set. The processing shifts from step S15 to step S31. The connection-apparatus control section 11e instructs the image pickup section 22 of the photographing apparatus 20 to perform photographing at a wide angle (step S31). Subsequently, the connection-apparatus control section 11e transfers the picked-up image picked up by the image pickup section 22 via the communication sections 24 and 14 (step S32).

In the next step S36, image comparison by the image comparing section 11c is performed. The image comparing section 11c calculates, using the features of the image obtained in step S12, in which region in the wide-angle image 44 by the image pickup section 22 an image similar to the telescopic image 42 by the image pickup section 12 is present. The image comparing section 11c outputs a range of the region as a detection result. The detection result of the image comparing section 11c is given to the angle-of-view determining section 11d. The angle-of-view determining section 11d generates display data for displaying a frame image indicating the range based on the detection result of the image comparing section 11c in the wide-angle image 44. The display data is supplied to the display control section 21a of the signal processing and control section 21 via the communication sections 14 and 24. In this way, the display control section 21a displays the angle-of-view display 46 by a frame image in the wide-angle image 44 of the display screen 28a (step S37).

FIG. 7B shows this state. The photographing apparatus 10 and the photographing apparatus 20 pick up images in substantially the same direction. The photographing apparatus 10 performs telescopic image pickup and the photographing apparatus 20 performs image pickup at a wide angle. On the display screen 28a of the photographing apparatus 20, the wide-angle image 44 by the image pickup section 22 is displayed and the angle-of-view display 46 corresponding to the region of the telescopic image 42 by the image pickup section 12 is also displayed.

In step S38, the display control section 11a displays the operation button 51 for moving image photographing on the display screen 18a. In the next step S39, the signal processing and control section 11 detects operation of the operation button 51 for moving image photographing and determines whether moving image photographing is instructed. When the operation button 51 is touched by a finger 53a, in step S40, the signal processing and control section 11 determines whether the moving image photographing is being performed. When the moving image photographing is not being performed, the signal processing and control section 11 starts the moving image photographing (step S41). When the moving image photographing is being performed, the signal processing and control section 11 ends the moving image photographing (step S42). Note that, when the user presses the shutter button 52 with a finger 53b, the processing shifts from step S39 to step S17. Still image photographing is performed (step S18).

In this way, the angle-of-view display 46 indicating a region in the image by the image pickup section 22 corresponding to all or a part of the range of the picked-up image by the image pickup section 12 is displayed on the display screen 28a. Consequently, the user can recognize the telescopic image 42 picked up by the image pickup section 12 and an approximate photographing direction of the telescopic image 42 referring to the display of the display screen 28a. This is extremely useful for composition setting and the like.

Note that, in the example explained above, the moving image photographing is performed in the photographing apparatus 10 in step S41 in FIG. 4. However, the connection-apparatus control section 11e may control the photographing apparatus 20 according to the moving image photographing operation to perform the moving image photographing in the photographing apparatus 20. In this case, in the processing for giving the metadata in step S19, a movie obtained by the moving image photographing of the photographing apparatus 20 may be given as metadata of the still image photographing in step S18. Irrespective of presence or absence of moving image photographing operation, a movie in a predetermined time before and after the still image photographing in step S18 may be automatically recorded as the metadata.

Note that, in the example explained above, the region of the frame image is determined by the image comparison in step S36. However, the region of the frame image may be determined based on information concerning an angle of view and a visual field direction.

Figure 8:
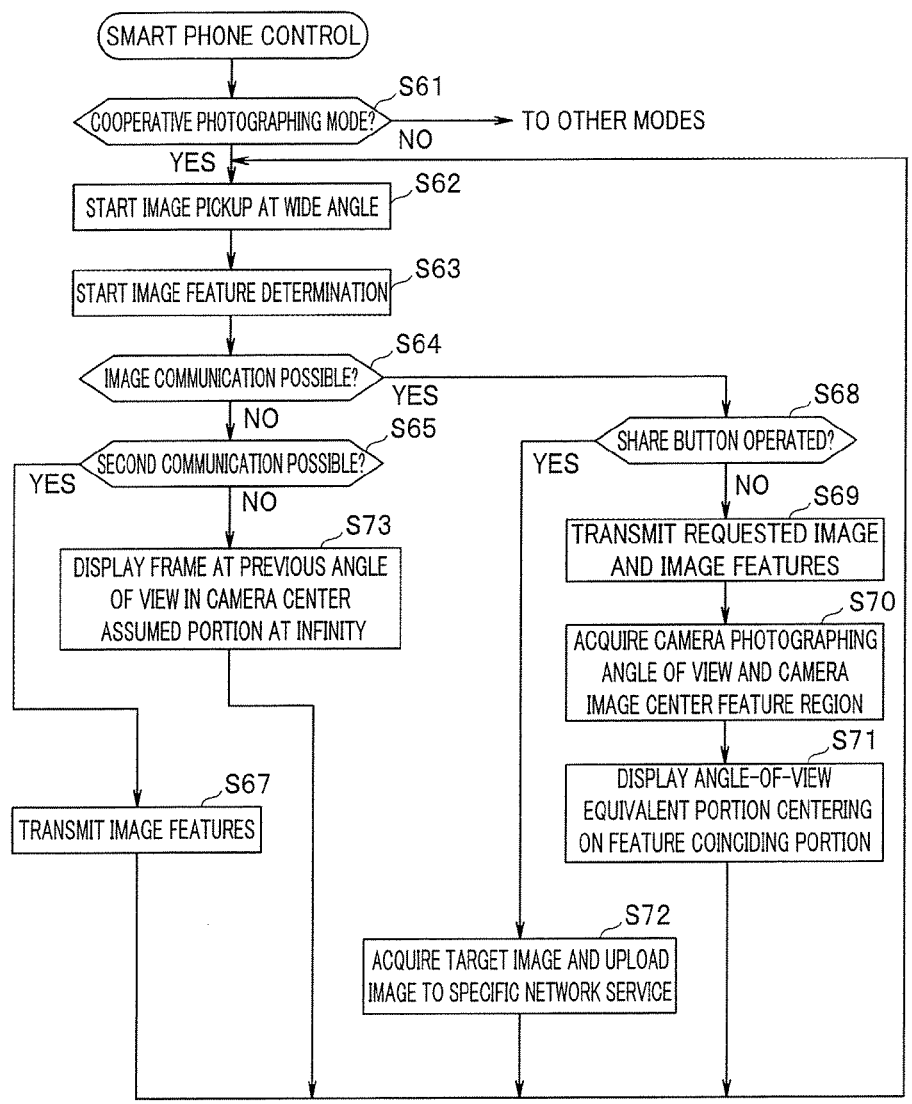
FIG. 8 is a flowchart for explaining control of a second photographing apparatus 20.

FIG. 8 is a flowchart for explaining control of the second photographing apparatus 20. In step S61 in FIG. 8, the signal processing and control section 21 determines whether the cooperative photographing mode is instructed. When the cooperative photographing mode is not instructed, the signal processing and control section 21 shifts to another mode. When the cooperative photographing mode is instructed, in step S62, the signal processing and control section 21 sets the image pickup section 22 at a wide angle and causes the image pickup section 22 to start image pickup. Subsequently, in step S63, the feature determining section 21b of the signal processing and control section 21 starts determination of image features.

The angle-of-view determining section 11d of the photographing apparatus 10 determines the angle of view based on the determination result of the feature determining section 11b. However, by transmitting the determination result of the image features from the photographing apparatus 20, the determination processing of the feature determining section 11b of the photographing apparatus 10 may be omitted. Therefore, step S63 may be omitted and the picked-up image by the image pickup section 22 may be directly transmitted.

In the next step S64, the signal processing and control section 21 determines whether, for example, image communication by the wireless LAN by the communication sections 14 and 24 is possible. For example, image communication by the communication sections 14 and 24 for enabling wireless LAN communication is impossible, the signal processing and control section 21 determines possibility of second communication by the communication sections 15 and 25 capable of performing communication such as Bluetooth (step S65). For example, communication speed by the communication sections 15 and 25 is low compared with communication speed by the communication sections 14 and 24. A long time is sometimes necessary for transmission of an image. Taking into account such a case, when the communication by the communication sections 15 and 25 is possible, in step S67, the signal processing and control section 21 transmits only information concerning image features. The angle-of-view determining section 11d of the photographing apparatus 10 can generate a frame image according to the information concerning the image features.

On the other hand, when the image communication by the communication sections 14 and 24 is possible, in step S68, the signal processing and control section 21 determines whether the share button is operated. When the share button is not operated, the signal processing and control section 21 transmits information concerning an image and image features requested from the photographing apparatus 10 (step S69). When the share button is operated, in step S72, the signal processing and control section 21 acquires a target image and uploads the image to a specific network service.

The signal processing and control section 21 generates a frame image based on the information concerning the image and the image features transmitted from the photographing apparatus 20. The frame image indicates a photographing range, a feature detection region in the screen center, or the like of the image pickup section 12. The signal processing and control section 21 receives information concerning the frame image (step S70) and displays the frame image on the display screen 28*a* (step S71). In this way, display shown in FIG. 7B is obtained.

In the present embodiment, when the communication by the communication sections 14, 24, 15, and 25 is impossible, the processing is shifted to step S73. In step S73, the signal processing and control section 21 displays a frame image corresponding to the last angle of view of the photographing apparatus 10 in a camera center assumed portion at infinity. If photographing directions of the photographing apparatuses 10 and 20 are substantially the same and the angle of view of the photographing apparatus 10 is the same as the angle of view at the last photographing time, the frame image is displayed in a position same as an actual position on the display screen 28*a*. Such a case occurs relatively often. By displaying the frame image, even if a communication failure or the like occurs, it is possible to display the photographing range of the image pickup section 12 on the display screen 28*a*. This is excellent in convenience.

In this way, according to the processing in step S73, for example, even if communication waiting occurs when photographing is wanted unexpectedly, by displaying an object, which would be photographed by the photographing apparatus 10, on the display screen 28*a* of the photographing apparatus 20 as quick as possible before communication, it is possible to prevent the object from being missed.

Note that, in step S67, a reduced image transmittable at low speed may be transmitted instead of the image feature. The photographing apparatus 10 may generate a frame image based on image features of the reduced image.

In the example of the flows shown in FIGS. 4 and 8, the frame image is generated on the photographing apparatus 10 side. However, it is evident that the photographing apparatus 20 may generate and display a frame image.

Figure 10:
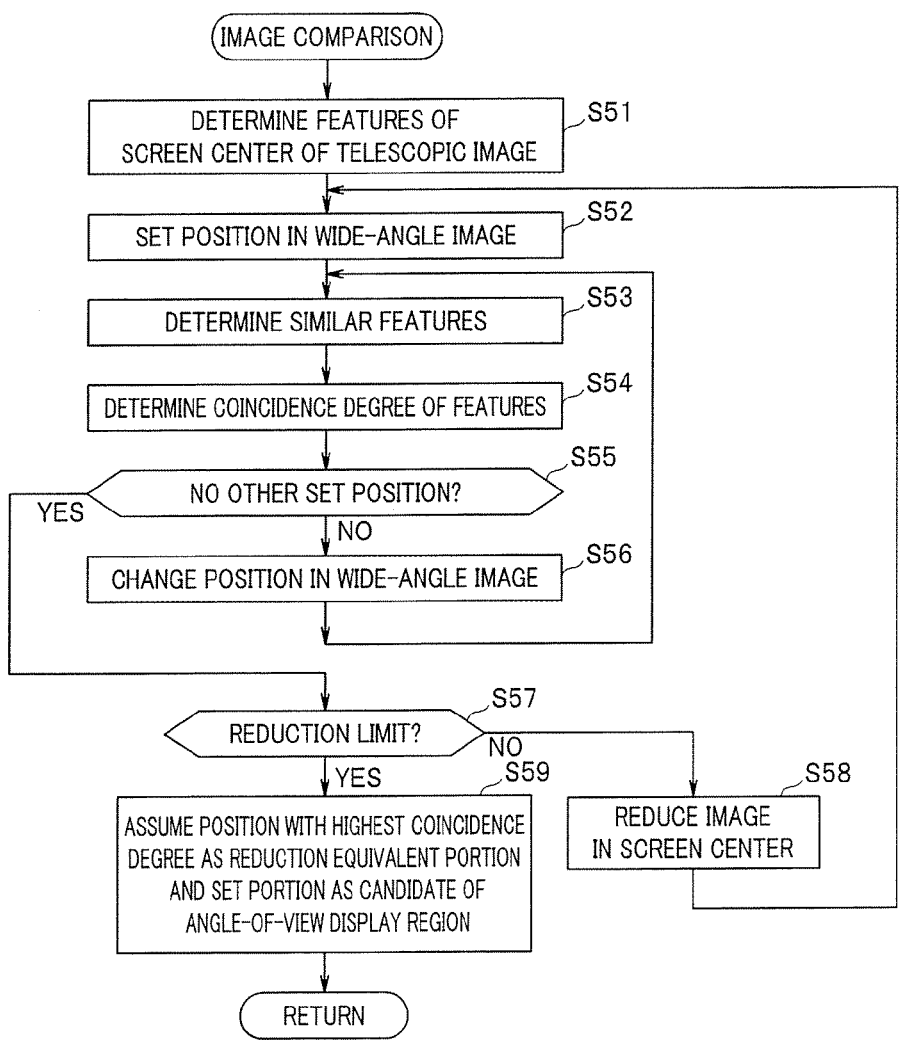
FIG. 10 is a flowchart for explaining an operation flow of image comparison processing.

FIGS. 9A to 9D are explanatory diagrams showing an example of the image comparison processing in step S36 in FIG. 4. FIG. 10 is a flowchart for explaining an operation flow of the image comparison processing. FIG. 9A shows a state in which the telescopic image 42 picked up by the image pickup section 12 of the photographing apparatus 10 is displayed on the display screen 18*a*. FIG. 9B shows a state in which the wide-angle image 44 picked up by the image pickup section 22 of the photographing apparatus 20 is displayed on the display screen 28*a*. The image 45 in the wide-angle image 44 and the image 43 in the telescopic image 42 are obtained by picking up an image of a bird, which is the same object.

In step S51 in FIG. 10, the feature determining section 11*b* determines a feature of an image (hereinafter referred to as determination target image) in the screen center of the picked-up image (the telescopic image 42) by the photographing apparatus 10. Subsequently, the image comparing section 11*c* sets a determination position in the picked-up image (the wide-angle image 44) by the photographing apparatus 20 and performs coincidence comparison of a feature of an image in the set determination position and a result of the feature determination of the determination target image obtained in step S51.

For example, if an image 43*a* shown in FIG. 9C is the determination target image, the image comparing section 11*c* sets a determination region of the same size as the image 43*a* in a predetermined determination position in the wide-angle image 44, performs determination of similar features (step S53), and calculates a coincidence degree of the features (step S54).

The image comparing section 11*c* moves the determination region in the wide-angle image 44 (step S56) and repeats the similarity determination in steps S53 and S54. When the similarity determination of the determination region ends in all determination positions, the image comparing section 11*c* shifts the processing from step S55 to step S57 and determines whether the processing reaches a reduction limit of the determination target image. When the processing does not reach the reduction limit, the image comparing section 11*c* shifts the processing to step S58, reduces the determination target image in the screen center (step S58), and repeats steps S52 to S56.

When the processing reaches the reduction limit of the determination target image, the image comparing section 11*c* sets a position having the highest degree of similarity of features as a reduction equivalent portion and sets the portion as a candidate of an angle-of-view display region. For example, as shown in FIG. 9C, the determination target image is sequentially reduced from the image 43*a* to images 43*b* and 43*c* and performs similarity determination of these images and the image in the determination region of the wide-angle image 44. For example, when a degree of coincidence concerning a determination region coinciding with the image 43*c* is the highest, the image comparing section 11*c* determines that the determination region is an image corresponding to the determination target image in the telescopic image 42. In FIG. 9D, the determination region 47 is indicated by a broken line.

In the present embodiment, as explained above, the angle-of-view display 46 indicating the position of the determination region 47 is displayed as a frame image on the display screen 28*a*.

Note that, in FIG. 10, the feature determining section 11*b* is explained as performing the feature determination of the screen center. However, the user may designate a position of the feature determination.

In this way, in the present embodiment, in the cooperative photographing mode, the frame image indicating the photographing range or the like is displayed on the display screen of the connected photographing apparatus 20. Consequently, even when it is difficult to track the object with the display of the own apparatus, it is possible to relatively easily track the object referring to the display screen of the other photographing apparatus. It is possible to simplify the photographing.

Incidentally, in order to enable designation of a photographing direction equally in all directions, the optical axis of the photographing apparatus 20 and the optical axis of the photographing apparatus 10 desirably coincide with each other. Therefore, before actual photographing, adjustment work for the optical axis of the photographing apparatus 10 and the optical axis of the photographing apparatus 20 is performed.

Figure 11:
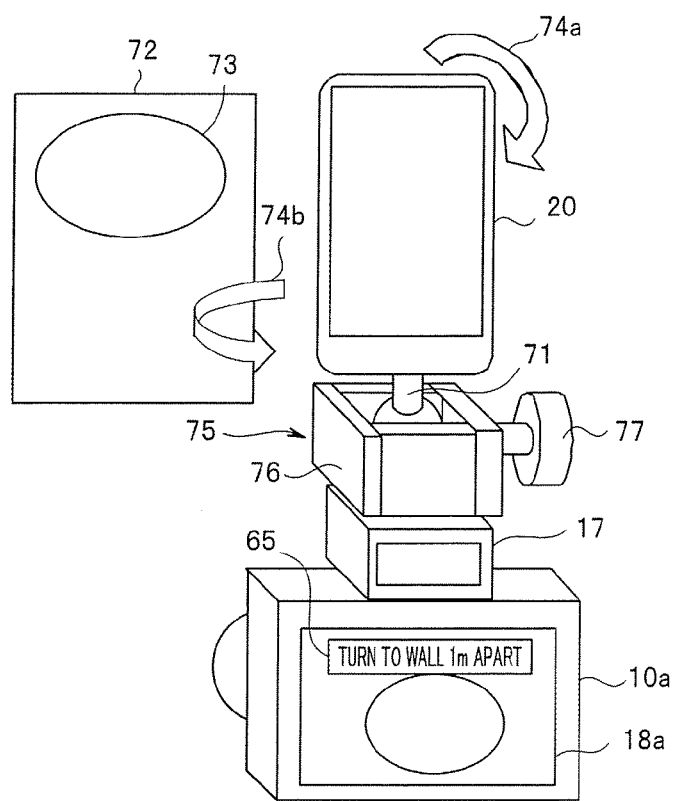
FIG. 11 is an explanatory diagram showing a mechanism for enabling adjustment work for optical axis alignment.
Figure 12:
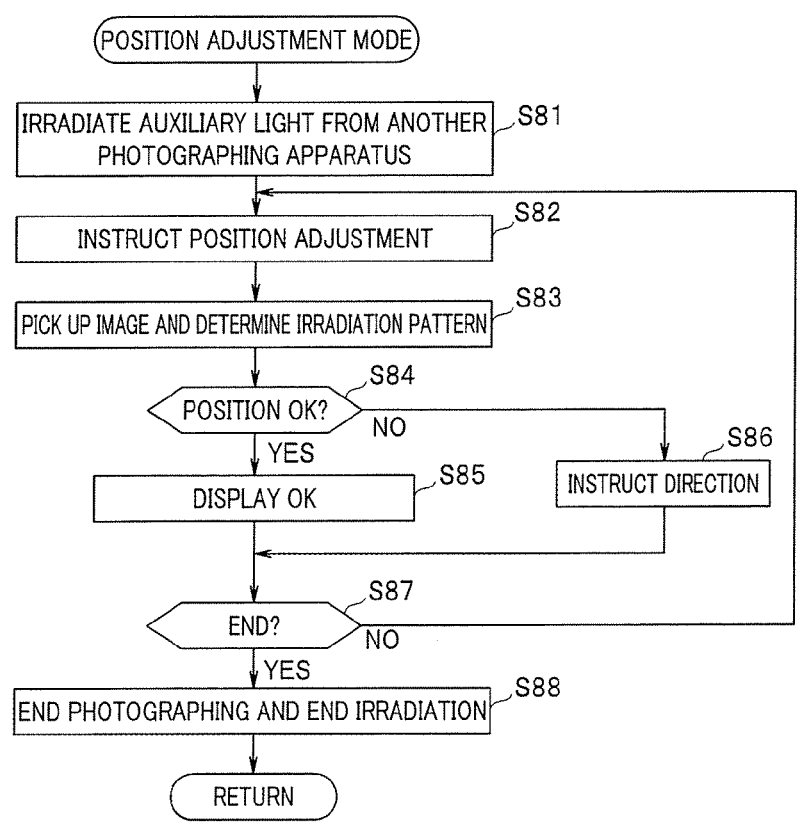
FIG. 12 is a flowchart for explaining an operation flow of signal processing and adjustment work by a control section 61.

FIG. 11 is an explanatory diagram showing a mechanism for enabling such adjustment work for optical axis alignment. FIG. 12 is a flowchart for explaining an operation flow of the adjustment work by the signal processing and control section 11 or 21. Note that the adjustment work for aligning the optical axes shown in FIGS. 11 and 12 is not a configuration essential for the present embodiment. A visual field direction can be determined even if the adjustment work for optical axis alignment is not performed.

As explained above, by loosening the screw 77, the spherical section of the ball stud 71 becomes slidable with respect to the spherical surface receiving section. The photographing apparatus 20 can be rotated in an elevation/depression angle direction of an arrow 74*a* in FIG. 11 and an azimuth direction of an arrow 74*b* in FIG. 11 around the spherical section. By tightening the screw 77 after aligning the optical axis of the photographing apparatus 20 with the optical axis of the photographing apparatus 10, the photographing apparatuses 10 and 20 can be fixed in a state in which the optical axes are aligned.

For example, in step S81 in FIG. 12, auxiliary light is irradiated from another photographing apparatus. FIG. 11 shows a state in which the auxiliary light is irradiated on a chart 72 arranged in front of the photographing apparatus 20. An elliptical high luminance portion 73 is reflected on the chart 72 by the auxiliary light. In step S82, message display instructing optical axis position adjustment is displayed on the display screen 18*a* of the display section 18. In the example shown in FIG. 11, message display "turn to wall 1*m* apart" is displayed.

In the next step S83, an image of the high luminance portion 73 of the chart 72 is picked up by the image pickup section 12 of the photographing apparatus 10. FIG. 11 shows a state in which the high luminance portion 73 is displayed as a through-image on the display screen 18*a*. An irradiation pattern is determined by a shape and a luminance distribution of an image portion corresponding to the high luminance portion 73 in the picked-up image obtained by the image pickup section 12. By comparing the irradiation pattern determined by the photographing apparatus 10 and an irradiation pattern of the high luminance portion 73 by the auxiliary light irradiated by the photographing apparatus 20, it is possible to determine whether the optical axes of the photographing apparatus 10 and the photographing apparatus 20 coincide with each other or determine a deviating direction of the optical axes.

When the optical axes coincide with each other, the processing shifts from step S84 to step S85. For example, OK display is displayed on the display screen 18*a*. When the optical axes do not coincide with each other, in step S86, direction indication display indicating in which direction the photographing apparatus 20 should be turned is displayed on the display screen 18*a*, for example. In this case, according to the direction indication display, the user changes the direction of the photographing apparatus 20.

Thereafter, the processing in steps S82 to S86 is repeated until the OK display is displayed. When the processing ends, the photographing by the photographing apparatus 10 and the irradiation of the auxiliary light by the photographing apparatus 20 is finished.

In the example explained above, the smart phone and the camera share roles such that the smart phone performs observation (and recording) at a wide angle of view and the camera performs observation (and recording) at a narrow angle of view. This makes it possible to perform check and photographing at a narrow angle of view while preventing missing of a target object. However, naturally, the same can be realized by two smart phones and two cameras. In this case, it is determined angles of view of which smart phones and cameras are a narrow angle of view and a wide angle of view. An observation range of the narrow angle of view is associated with an observation range of the wide angle of view. It is possible to provide, in any combination of apparatuses, an observation apparatus, a display apparatus, and a photographing apparatus that can easily find an object that is likely to be missed at the narrow angle of view.

Second Embodiment

Figure 13:
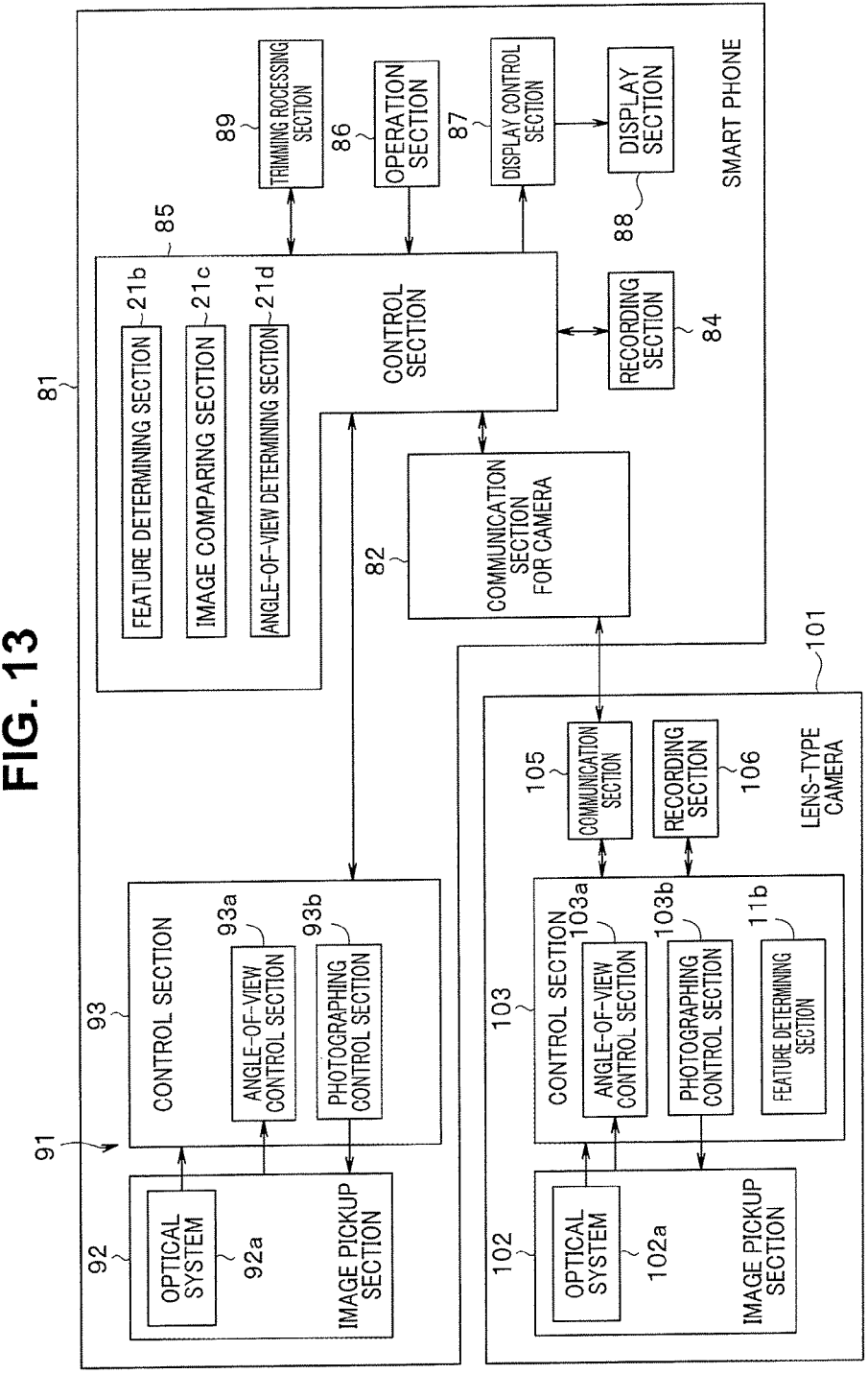
FIG. 13 is a block diagram showing a second embodiment of the present invention.
Figure 14:
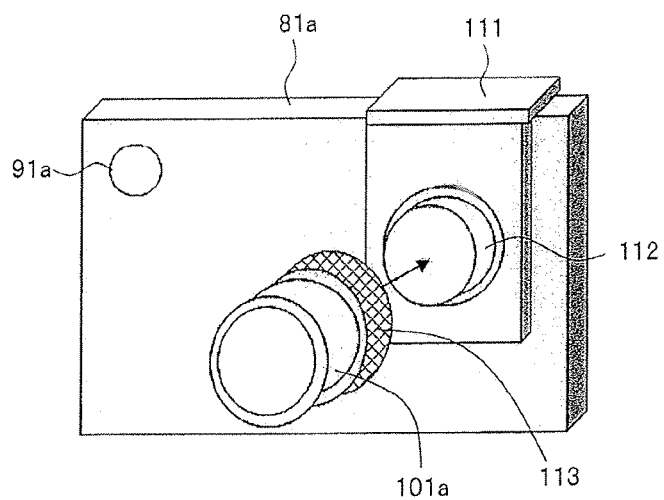
FIG. 14 is an explanatory diagram for explaining an external appearance in the second embodiment.

FIG. 13 is a block diagram showing a second embodiment of the present invention. FIG. 14 is an explanatory diagram for explaining an external appearance in the second embodiment. In FIG. 13, components same as the components shown in FIG. 2 are denoted by the same reference numerals and signs and explanation of the components is omitted. The present embodiment is an example in which, as two image pickup sections that perform photographing in cooperation, a smart phone including a built-in camera and a lens-type camera attached to a housing of the smart phone are adopted.

In FIG. 13, a lens-type camera 101 corresponds to the image pickup section 3 and the camera control section 1 shown in FIG. 1. A smart phone 81 corresponds to the image pickup section 2 and the camera control section 1 shown in FIG. 1. In the example shown in FIG. 13, the functions of the camera control section 1 are distributed to the lens-type camera 101 and the smart phone 81. However, any one of the lens-type camera 101 and the smart phone 81 may include the functions of the camera control section 1.

As shown in FIG. 14, an attachment 111 is detachably attached to a housing 81*a* of the smart phone 81. An attaching section 112 for attaching the lens-type camera 101 is provided in the attachment 111. An attaching section 113 is provided on the proximal end side of the lens-type camera 101. The attaching section 113 can be attached to the attaching section 112 of the attachment 111 by fitting, screwing, or the like.

In FIG. 13, a communication section for camera 82 is provided in the smart phone 81. A communication section 105 is provided in the lens-type camera 101. The smart phone 81 and the lens-type camera 101 are capable of communicating with each other via the communication sections 82 and 105. A display section 88 equivalent to the display section 2*c* shown in FIG. 1 is provided in the smart phone 81. A display control section 87 equivalent to the display control section 1*c* shown in FIG. 1 can display a picked-up image from the lens-type camera 101 on a display screen of the display section 88.

In the lens-type camera 101, an image pickup section 102 including an optical system 102*a* housed in a lens barrel 101*a* is provided. The optical system 102*a* includes, in the lens barrel 101*a*, a focus lens moved to set a focus state through focusing and a zoom lens for magnification in a focus state. The optical system 102*a* includes a not-shown mechanical section that drives the lenses and a diaphragm.

In the image pickup section 102, a not-shown image pickup device configured by a CCD or CMOS sensor or the like is provided. An object image is guided to an image pickup surface of the image pickup device by the optical system 102*a*. A control section 103 configuring the angle-of-view/direction setting section 2*a* shown in FIG. 1 controls the mechanical section of the optical system 102*a* and controls to drive the focus lens, the zoom lens, and the diaphragm.

The control section 103 of the lens-type camera 101 is configured by a CPU and the like. The control section 103 controls the respective sections of the lens-type camera 101 based on signals from the smart phone 81 to be explained below. A photographing control section 103b generates a focus signal, a zoom signal, and a diaphragm control signal and controls to drive the focus, the zoom, and the diaphragm of the optical system 102a. The photographing control section 103b supplies a driving signal to the image pickup device and controls image pickup of the object. A photographing angle of view of the angle-of-view control section 103a is designated from the smart phone 81. The angle-of-view control section 103a can control the image pickup section 102 to adjust a photographing angle of view.

A picked-up image from the image pickup section 102 is given to the control section 103. The control section 103 applies predetermined image signal processing such as color adjustment processing, matrix transformation processing, noise removal processing, and other various kinds of signal processing to the picked-up image. Thereafter, the control section 103 can give the picked-up image to the recording section 106 and record the picked-up image. As the recording section 106, for example, an IC memory can be adopted. The control section 103 can transfer the picked-up image to the smart phone 81 via the communication section 105.

The control section 103 can transfer information concerning the lenses such as lens states of the zoom lens, the focus lens, and the like and a diaphragm state to the smart phone 81 via the communication section 105. The information concerning the lenses includes information concerning a focus position and an angle of view. In the control section 103, a feature determining section 21b is provided. The control section 103 can also transmit information concerning a determination result of the feature determining section 21b to the smart phone 81.

The communication section 105 can perform communication with the communication section for camera 82 provided in the smart phone 81 via a predetermined transmission channel. As the transmission channel, various wired and wireless transmission channels can be adopted, for example, Bluetooth, a USB (universal serial bus) cable, and a transmission channel of a wireless LAN such as Wifi. When communication is established between the control section 103 and the smart phone 81, photographing is controlled according to a control section 85 of the smart phone 81. The control section 103 can transfer various kinds of information concerning a picked-up image and photographing to the smart phone 81.

The smart phone 81 includes a control section 85 configured by a CPU and the like. The control section 85 controls the respective sections of the smart phone 81. The control section 85 outputs a driving signal for the image pickup device to the control section 103 of the lens-type camera 101 via the communication section for camera 82 and receives a picked-up image from the lens-type camera 101. The control section 85 applies predetermined signal processing such as color adjustment processing, matrix transformation processing, noise removal processing, and other various kinds of signal processing to the read-out picked-up image.

In the smart phone 81, an operation section 86 is also disposed. The operation section 86 is configured by not-shown various operation sections such as switches, keys, and a software keyboard provided in the smart phone 81. The operation section 86 generates an operation signal based on user operation and outputs the operation signal to the control section 85. The control section 85 controls the respective sections based on the operation signal.

The control section 85 can perform processing concerning recording and reproduction of a picked-up image. For example, the control section 85 can compress a picked-up image after the signal processing, give an image after the compression to a recording section 84, and cause the recording section 84 to record the image. As the recording section 84, various recording media such as an IC memory can be adopted. The recording section 84 can record image information, sound information, and the like in a recording medium.

The display control section 87 executes various kinds of processing concerning display. The picked-up image after the signal processing is given to the display control section 87 from the control section 85. The display control section 87 can give the picked-up image to the display section 88. The display section 88 includes a display screen such as an LCD and displays the image given from the display control section 87. The display control section 87 can also display various kinds of menu display and the like on a display screen of the display section 88. The control section 85 can read out a picked-up image recorded in the recording section 84 and expand the picked-up image. The display control section 87 gives the expanded picked-up image to the display section 88. Consequently, the recorded image can be reproduced.

A not-shown touch panel is provided on the display screen of the display section 88. The touch panel can generate an operation signal corresponding to a position on the display screen pointed by the finger of the user. The operation signal is supplied to the control section 85. Consequently, when the user touches the display screen or slides the finger on the display screen, the control section 85 can detect various kinds of operation such as a touch position of the user, operation for closing and opening fingers (pinch operation), slide operation and a position to which the finger reaches through the slide operation, a slide direction, and a period in which the user touches the display screen. The control section 85 can execute processing corresponding to the user operation.

Note that the display screen is disposed to occupy, for example, substantially the entire region of the front surface of the housing 81a of the smart phone 81. The user can check a picked-up image displayed on the display screen of the display section 88 during photographing by the lens-type camera 101 and can perform photographing operation while checking the picked-up image.

The smart phone 81 includes a trimming processing section 89. A trimming range of the trimming processing section 89 is designated by the control section 85. The trimming processing section 89 can trim and output a picked-up image from the lens-type camera 101.

The smart phone 81 includes a built-in camera 91. The built-in camera 91 is configured by an image pickup section 92 and a control section 93 having configurations same as the configurations of the image pickup section 102 and the control section 103 of the lens-type camera 101. Note that a feature determining section is not provided in the control section 93 of the built-in camera 91 and is provided in the control section 85. However, the feature determining section may be provided in the control section 93 of the built-in camera 91. The control section 93 outputs a picked-up image by the image pickup section 92 to the control section 85. Note that the control section 85 grasps in advance information concerning a focus position and an angle of view of the built-in camera 91.

Figure 15:
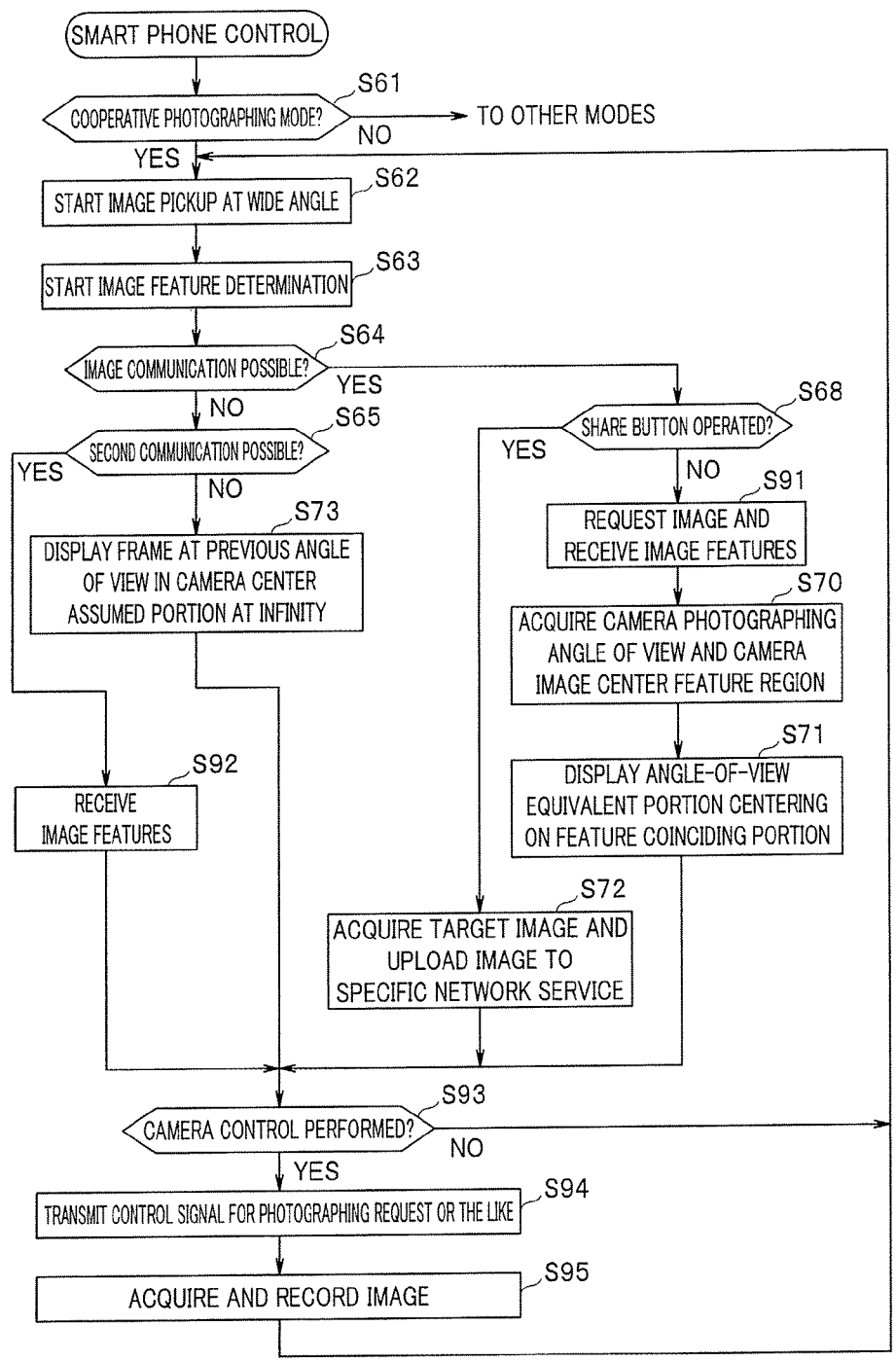
FIG. 15 is a flowchart for explaining control of a smart phone 81.

An operation in the embodiment configured as explained above is explained with reference to FIG. 15. FIG. 15 is a flowchart for explaining the control of the smart phone 81. In FIG. 15, processes same as the processes in FIG. 8 are denoted by the same signs and explanation of the processes is omitted.

In the example shown in FIG. 8, the frame image is generated on the photographing apparatus 10 side. On the other hand, in an example shown in FIG. 15, the frame image is generated on the smart phone 81 side. When determining in step S64 in FIG. 15 that the image communication can be performed by the communication section for camera 82, in step S91, the control section 85 requests the lens-type camera 101 to transmit information concerning an image and image features.

When determining in step S64 that the image communication is impossible, in step S65, the control section 85 determines whether second communication at low speed is possible. For example, when the communication section for camera 82 includes functions of not only Wifi communication but also Bluetooth and infrared communication, the control section 85 determines whether the Bluetooth and the infrared communication are possible. When determining that these kinds of second communication are possible, the control section 85 requests the lens-type camera 101 to transmit information concerning image features (step S92). The lens-type camera 101 determines the image features with the feature determining section 11b and transmits information concerning the determination to the control section 85 via the communication sections 105 and 82.

The feature determining section 21b of the control section 85 determines the image features of the image received in step S91, determines features of the picked-up image of the built-in camera 91, and gives a determination result to the image comparing section 21c. The image comparing section 21c of the control section 85 determines, based on the information concerning the image features received in step S91 or S92 and the information concerning the image features obtained from the feature determining section 21b, whether a region corresponding to a part or all of the picked-up image by the image pickup section 102 of the lens-type camera 101 is present in the picked-up image by the image pickup section 92 of the built-in camera 91. When the region is present, the image comparing section 21c calculates a position on the picked-up image of the image pickup section 92 concerning the region.

A detection result of the image comparing section 21c is given to the angle-of-view determining section 21d. The angle-of-view determining section 21d generates a frame image indicating a range on the picked-up image of the image pickup section 92 corresponding to a part or all of the picked-up image of the image pickup section 102 (step S70). The display control section 87 displays the frame image on the display screen of the display section 88 to be superimposed on the picked-up image of the image pickup section 92.

In step S93, the control section 85 determines whether camera control for the lens-type camera 101 is performed. When the camera control is performed, the control section 85 transmits a control signal of a photographing request or the like to the lens-type camera 101 (step S94). Consequently, when a picked-up image is transmitted from the lens-type camera 101, in step S95, the control section 85 acquires the image and causes the recording section 84 to record the image.

Note that, in the present embodiment as well, when communication with the lens-type camera 101 by the communication section for camera 82 is impossible, in step S73, a frame image corresponding to the last angle of view of the lens-type camera 101 is displayed in a camera center assumed portion at infinity. If photographing directions of the image pickup sections 92 and 102 are substantially the same and the angle of view of the image pickup section 92 is the same as the angle of view at the last photographing time, the frame image is displayed in a position same as an actual position on the display screen. Such a case occurs relatively often. By displaying the frame image, even if a communication failure or the like occurs, it is possible to display the photographing range of the image pickup section 102 on the display screen of the display section 88. This is excellent in convenience.

In an apparatus not including the function of displaying a picked-up image unlike the lens-type camera, if communication waiting occurs because of a communication failure when photographing is wanted unexpectedly, it is likely that an object is missed. In the present embodiment, even before communication with the camera, it is possible to display the object, which would be photographed by the lens-type camera 101, on the smart phone 81 side. The built-in camera 91 can quickly start without requiring negotiation by wireless communication or the like unlike the lens-type camera 101. Therefore, it is possible to perform assured photographing without missing a shutter releasing opportunity.

As explained above, in the present embodiment as well, effects same as the effects in the first embodiment can be obtained.

Note that, in the explanation in the present embodiment, the smart phone 81 displays the image of the built-in camera 91 on the display screen of the display section 88 and displays, on the image, the frame image indicating a part or all of the regions of the picked-up image of the lens-type camera 101. However, the picked-up image of the lens-type camera 101 may be displayed on the display screen of the display section 88 according to switching operation by the user.

In the respective embodiments, the digital camera is explained as the apparatus for photographing. However, the camera may be a digital single-lens reflex camera or a compact digital camera, or may be a camera for moving images such as a video camera or a movie camera, or may be a camera incorporated in a portable information terminal (PDA: personal digital assistant) such as a cellular phone or a smart phone.

Naturally, measures against missing of an object could be necessary not only in photographing by a telephoto lens but also in an apparatus, a system, and the like for proximity observation. The present invention also includes user support by sharing of an angle of view in such a situation. The present invention is applicable to a plurality of microscopes or inspection apparatuses, a plurality of medical observation apparatuses, and the like, one of which could be a smart phone. In an aspect of the present invention, an image pickup and observation apparatus includes a communication section that communicates with another photographing apparatus including an image pickup section that outputs a first picked-up image obtained by photographing an object and a display control section for displaying the first picked-up image. The image pickup and observation apparatus includes a transmitting function for comparing the first picked-up image from the other photographing apparatus and a picked-up image obtained by the image pickup and observation apparatus, transmitting a comparison result to the other photographing apparatus, and displaying the comparison result. The image comparison may be performed in the second apparatus. In that case, the apparatus may transmits an image or transmit features of the image.

The present invention is not limited to the respective embodiments per se. In an implementation stage, the constituent elements can be modified and embodied without departing from the spirit of the present invention. Various inventions can be formed by appropriate combinations of the plurality of constituent elements disclosed in the respective embodiments. For example, several constituent elements of all the constituent elements disclosed in the embodiments may be deleted. Further, the constituent elements in the different embodiments may be combined as appropriate.

Note that, concerning the operation flows in the claims, the specification, and the drawings, even if "first", "next", and the like are used in the explanation for convenience, this does not mean that it is essential to carry out the operation flows in this order. It goes without saying that, in the respective steps configuring the operation flows, portions not affecting the essence of the invention can be omitted as appropriate.

Note that, among the techniques explained herein, the control mainly explained in the flowcharts often can be set by a computer program. The computer program is sometimes stored in a recording medium or a recording section. As a method of recording the recording medium or the recording section, the computer program may be recorded during product shipment, may be recorded using a distributed recording medium, or may be downloaded via the Internet.

What is claimed is:

1. A photographing apparatus comprising:
    an image pickup device configured to output a first picked-up image obtained by photographing an object;
    a display for displaying the first picked-up image; and
    a processor comprising:
        a comparing circuit configured to compare an angle of view of the first picked-up image from the image pickup device and an angle of view of a second picked-up image from a second photographing apparatus; and
        an angle-of-view determining circuit configured to control, based on a comparison result of the comparing circuit, the display to display, in the first picked-up image, a display indicating a part or whole of an image pickup range of the second picked-up image, wherein
    the comparing circuit obtains the comparison result by reducing a determination target image, the determination target image being a partial image in the second picked-up image, setting a determination region of the same size as the reduced determination target image on the first picked-up image, and making a determination on similar features between the determination target image and the first picked-up image in the determination region, and
    the display control circuit displays an angle-of-view display indicating the determination region on the first picked-up image.

2. The photographing apparatus according to claim 1, wherein the comparing circuit determines image features of the first and second picked-up images and outputs a region where the image features coincide with each other to the angle-of-view determining circuit as the comparison result.

3. The photographing apparatus according to claim 1, wherein the comparing circuit is given information concerning the angles of view of the first and second picked-up images from the image pickup device and the second photographing apparatus and performs the comparison.

4. The photographing apparatus according to claim 1, wherein the image pickup device obtains the first picked-up image with photographing at a wide angle.

5. The photographing apparatus according to claim 1, further comprising a communication device configured to perform communication with the second photographing apparatus, wherein
    the communication device receives, from the second photographing apparatus, at least one of the second picked-up image and information concerning image features of the second picked-up image.

6. The photographing apparatus according to claim 1, further comprising a communication device configured to perform communication with the second photographing apparatus, wherein
    the communication device receives, from the second photographing apparatus, information concerning the angle of view of the second picked-up image.

7. An image pickup and observation apparatus comprising:
    a communication device configured to communicate with a first photographing apparatus including a first image pickup device configured to output a first picked-up image obtained by photographing an object and a display for displaying the first picked-up image;
    a second image pickup device; and
    a processor comprising a comparing circuit configured to compare the first picked-up image from the first photographing apparatus and a picked-up image obtained by the second image pickup device, wherein
    the communication device transmits a comparison result to the first photographing apparatus,
    the comparing circuit obtains the comparison result by reducing a determination target image, the determination target image being a partial image in a picked-up image obtained by the second image pickup device, setting a determination region of the same size as the reduced determination target image on the first picked-up image, and making a determination on similar features between the determination target image and the first picked-up image in the determination region and
    the display displays an angle-of-view display indicating the determination region on the first picked-up image.

8. An image comparison and display method comprising:
    a step of acquiring an image signal from a first image pickup section that picks up a first picked-up image;
    a step of acquiring an image signal from a second image pickup section that picks up a second picked-up image;
    a step of determining image acquisition ranges respectively of the first and second image pickup sections;
    a step of comparing the image signals from the first and second image pickup sections; and
    a display control step of performing, based on the comparison result, control to display, in a wider one of the image acquisition ranges of the first and second image pickup sections, a display indicating a part or whole of a picked-up image in a narrower range, wherein
    when the image acquisition range of the first image pickup section is larger than the image acquisition range of the second image pickup section:
        the comparing step obtains the comparison result by reducing a determination target image, the determination target image being a partial image in the second picked-up image, setting a determination region of the same size as the reduced determination target image on the first picked-up image, and making a determination on similar features between the determination target image and the first picked-up image in the determination region, and the display control step displays an angle-of-view display indicating the determination region on the first picked-up image.

9. An image comparison and display system comprising:
a first image pickup device configured to pick up a first picked-up image;
a second image pickup device configured to pick up a second picked-up image;
a processor comprising:
   an angle-of-view determining circuit configured to determine image acquisition ranges respectively of the first and second image pickup devices; and
   a comparing circuit configured to compare the picked-up images respectively acquired by the first and second image pickup devices; and
a display configured to perform, based on the comparison result of the comparing circuit, control to display, in a wider one of the image acquisition ranges of the first and second image pickup devices, a display indicating a part or whole of a picked-up image in a narrower range, wherein
when the image acquisition range of the first image pickup device is larger than the image acquisition range of the second image pickup device:
   the comparing circuit obtains the comparison result by reducing a determination target image, the determination target image being a partial image in the second picked-up image, setting a determination region of the same size as the reduced determination target image on the first picked-up image, and making a determination on similar features between the determination target image and the first picked-up image in the determination region, and
   the display displays an angle-of-view display indicating the determination region on the first picked-up image.

10. A non-transitory computer-readable recording medium having recorded therein an image comparison display program for causing a computer to execute:
a step of acquiring an image signal from a first image pickup section that picks up a first picked-up image;
a step of acquiring an image signal from a second image pickup section that picks up a second picked-up image;
a step of determining image acquisition ranges respectively of the first and second image pickup sections;
a step of comparing the picked-up images respectively acquired by the first and second image pickup sections; and
a display control step of performing, based on the comparison result, control to display, in a wider one of the image acquisition ranges of the first and second image pickup sections, a display indicating a part or whole of a picked-up image in a narrower range, wherein
when the image acquisition range of the first image pickup section is larger than the image acquisition range of the second image pickup section:
   the comparing step obtains the comparison result by reducing a determination target image, the determination target image being a partial image in the second picked-up image, setting a determination region of the same size as the reduced determination target image on the first picked-up image, and making a determination on similar features between the determination target image and the first picked-up image in the determination region, and
   the display control step displays an angle-of-view display indicating the determination region on the first picked-up image.

* * * * *